United States Patent [19]

Ellis et al.

[11] 4,250,398
[45] Feb. 10, 1981

[54] SOLID STATE ELECTRICALLY CONDUCTIVE LAMINATE

[75] Inventors: Harold Ellis, Miami Beach; Alexander De Fonso, Hollywood, both of Fla.; Stephen Rosa, Bethesda, Md.

[73] Assignee: Delphic Research Laboratories, Inc., Miami, Fla.

[21] Appl. No.: 883,008

[22] Filed: Mar. 3, 1978

[51] Int. Cl.³ .............................................. H05B 3/06
[52] U.S. Cl. .................................... 219/345; 338/211; 338/225; 252/510; 428/480; 428/323; 219/528; 219/553; 219/549
[58] Field of Search ............... 219/539, 553, 552, 345, 219/549, 548, 443, 528; 338/211, 212–222; 252/506, 509, 510, 511; 174/121 R; 428/323, 408, 480, 481, 482, 483

[56] References Cited

U.S. PATENT DOCUMENTS

| | | | |
|---|---|---|---|
| 2,458,184 | 1/1949 | Marick | 219/345 |
| 2,608,634 | 8/1952 | Abbott | 219/345 |
| 2,683,673 | 7/1954 | Silversher | 219/549 |
| 2,825,702 | 3/1958 | Silversher | 252/503 |
| 2,952,761 | 9/1960 | Smith-Johannsen | 219/345 |
| 3,061,501 | 10/1962 | Dittman et al. | 156/250 |
| 3,099,578 | 7/1963 | Hunter | 117/226 |
| 3,180,781 | 4/1965 | Ryan et al. | 161/45 |
| 3,264,595 | 8/1966 | Hager, Jr. | 219/213 |
| 3,272,900 | 9/1966 | Ryan et al. | 264/125 |
| 3,385,959 | 5/1968 | Ames et al. | 219/549 |
| 3,454,746 | 7/1969 | DuBois | 219/345 |
| 3,518,116 | 6/1970 | Stock et al. | 117/226 |
| 3,657,516 | 4/1972 | Fujihara | 219/345 |
| 3,696,054 | 10/1972 | Saunders | 252/511 |
| 3,839,134 | 10/1974 | Fujihara | 219/549 |
| 3,859,504 | 1/1975 | Motokawa et al. | 219/549 |
| 3,878,362 | 4/1975 | Stinger | 219/549 |
| 3,900,654 | 8/1975 | Stinger | 219/553 |
| 3,923,697 | 12/1975 | Ellis | 252/511 |
| 3,993,842 | 11/1976 | Hirsch et al. | 252/511 |
| 3,999,040 | 12/1976 | Ellis | 252/511 |
| 4,035,265 | 7/1977 | Saunders | 252/511 |
| 4,064,074 | 12/1977 | Ellis | 252/511 |

OTHER PUBLICATIONS

"Water Vapor Density Calculations", Concrete Construction, Nov. 1979.

Primary Examiner—C. L. Albritton
Assistant Examiner—Bernard Roskoski
Attorney, Agent, or Firm—Beveridge, DeGrandi, Kline & Lunsford

[57] ABSTRACT

A unitary, composite laminated article comprises an electrically insulating top layer and an electrically insulating bottom layer. Applied to the inner surfaces of each of these layers is a barrier layer substantially impermeable to moisture and water vapor. A substantially continuous electrically conductive layer of substantially uniform thickness is interposed between the barrier layers. The electrically conductive layer is comprised mainly of carbon and is capable of emitting electromagnetic radiation when an electric current is passed therethrough. In contact with the electrically conductive layer is electrical conductor means. The top layer and bottom layer are sealed together to thereby form an enclosed laminate. The electrically conductive layer exhibits very stable resistivity. The use of the article as a radiant heating device and a method for its manufacture are provided. The device is especially useful for personal comfort heating and as a heat source in commercial, residential and industrial establishments.

17 Claims, 9 Drawing Figures

U.S. Patent  Feb. 10, 1981  Sheet 1 of 3  4,250,398
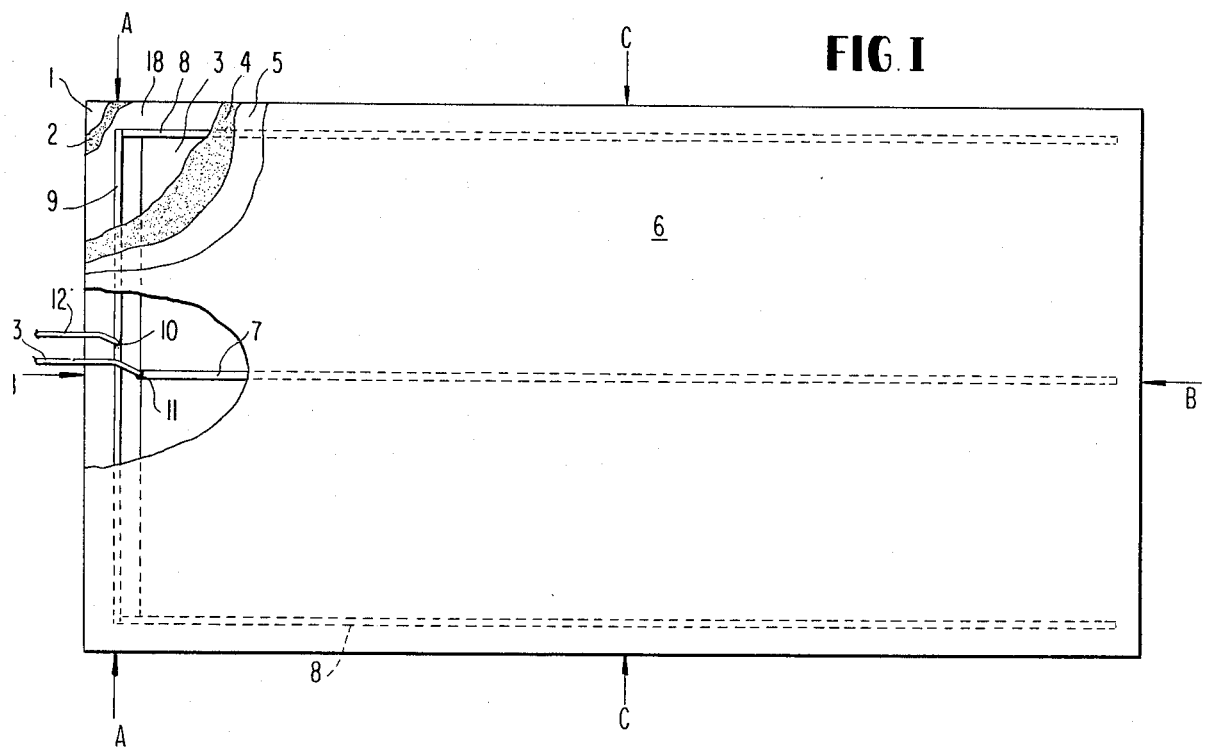
FIG. I
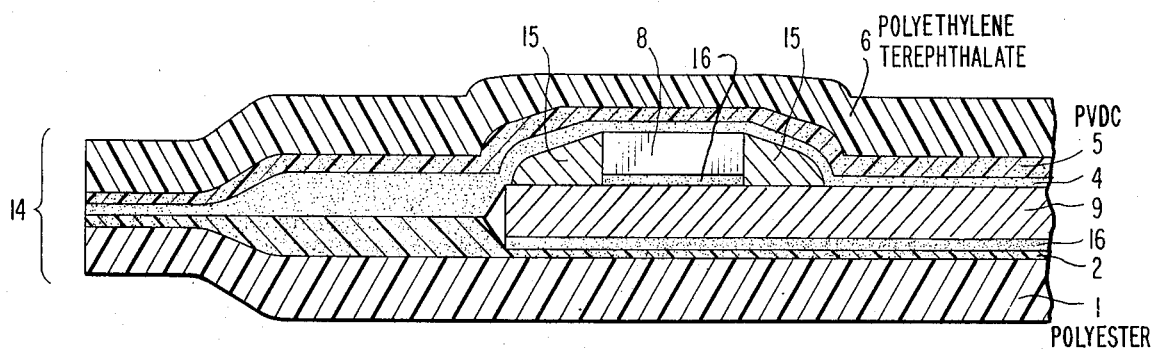
FIG. II
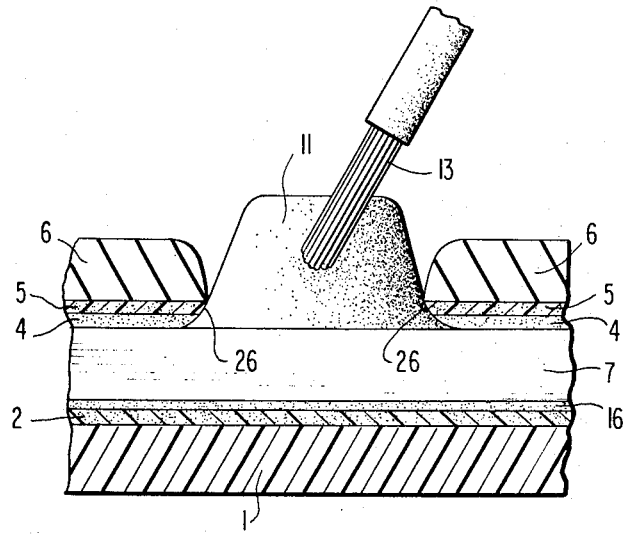
FIG. III

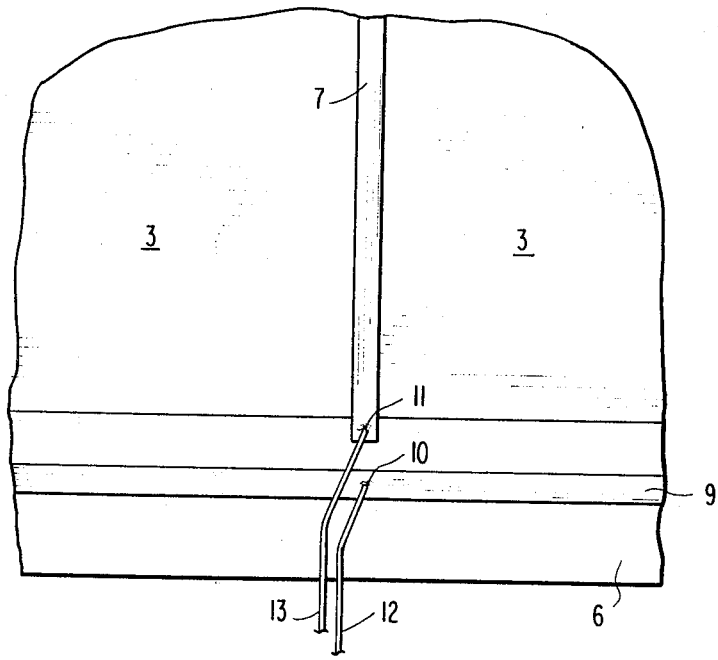
FIG. IV
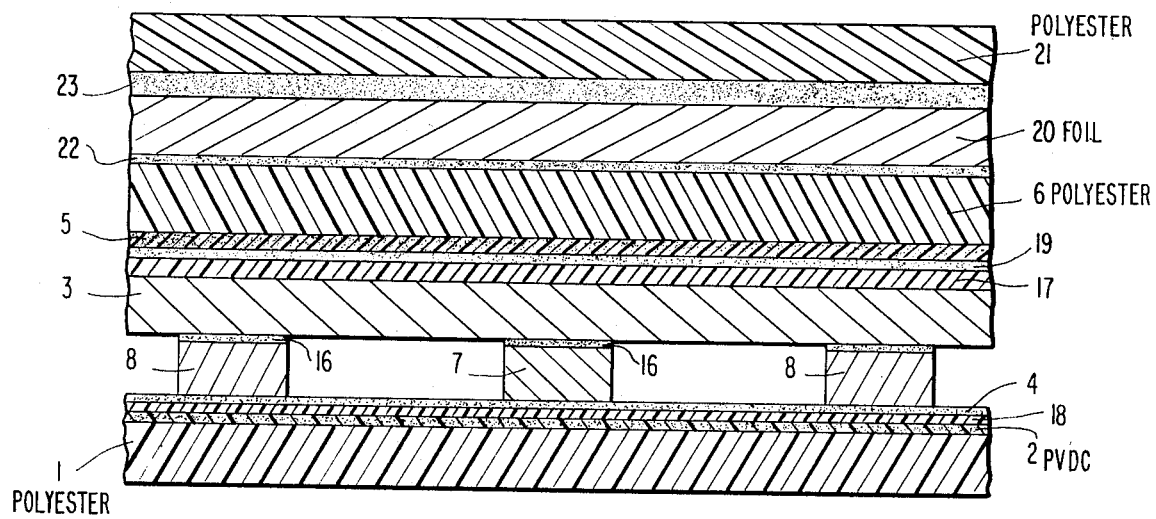
FIG. V

FIG. VII A
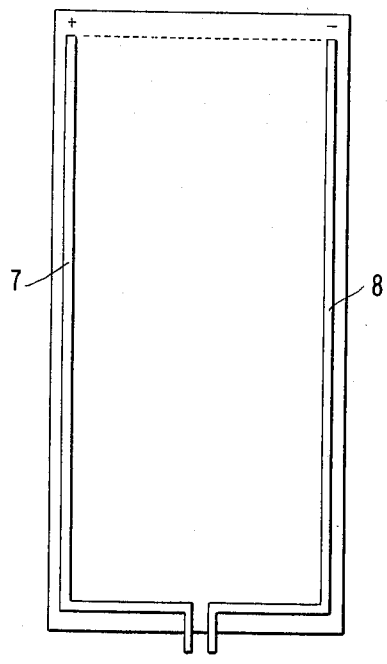
FIG. VII B
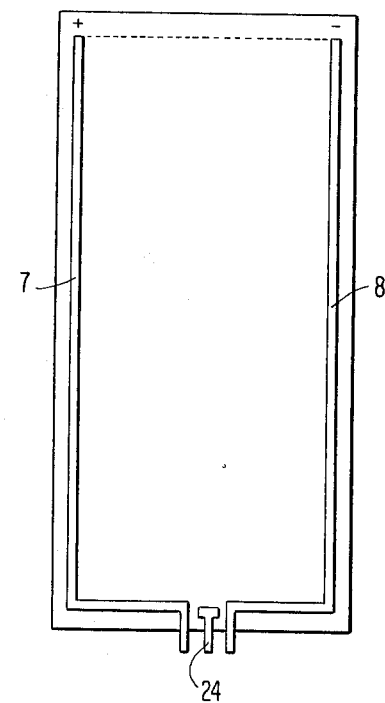
FIG. VII C
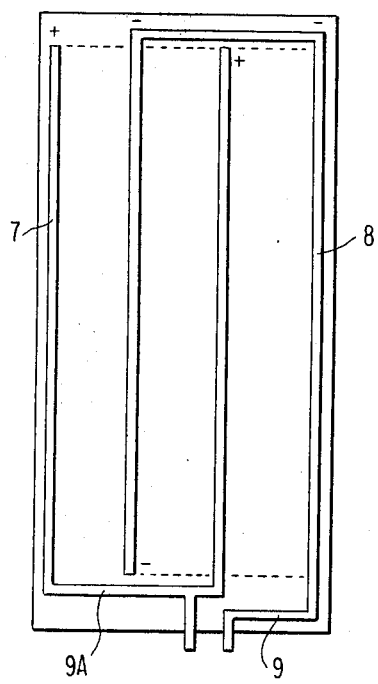
FIG. VII D
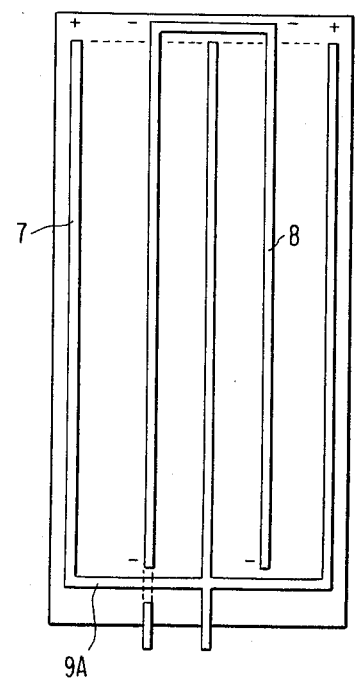

SOLID STATE ELECTRICALLY CONDUCTIVE LAMINATE

BACKGROUND OF THE INVENTION

1. Field of the Invention

This invention relates to an article of manufacture based on a structurally defined laminate. More particularly, this invention relates to a unitary, composite, flexible laminated article having electrically conductive means disposed therein, and in which layers of the laminate are bonded to each other. This invention also relates to the use of such a laminated article as a heating device and to a method for preparing the article.

2. Description of the Prior Art

A number of low-temperature electric radiant heaters utilizing resistor wires, etched metal foils and electrically conductive films have been described in the prior art. For the most part, they operate at temperatures below about 250° F. These heaters are used in a variety of applications, including personal comfort heating, agribusiness and industrial processes.

For example, radiant heating panels have been fabricated by embedding resistive wires in an insulating substrate, such as gypsum board, or by applying the wires directly to the insulating substrate. A variety of types of etched aluminum and other metal foil heating elements have also been proposed. For instance, a commercially available unit comprises a metal foil laid between two layers of clear polyester film.

Resistive wire heaters and etched metal heaters suffer a major deficiency in that all of the current is usually carried by a single continuous conductor. A break anywhere in the electrically conductive path renders the entire heater inoperable. Additionally, since the resistive wires operate at relatively high temperatures, such as up to 400° F., they must be covered and insulated so as not to char or weaken the substrate with which they are in contact. The substrate interposes an additional insulative layer between the heating element and the intended receptor and thereby reduces the effectiveness of heat transmission. They also require high voltages, such as 208 to 288 volts AC. In addition, non-oxidized metals have a low emissivity, which reduces their effectiveness in converting electrical energy into radiant heat.

Metallic powders, transparent vapor-deposited metals or metal oxides, and conductive carbon black or graphite have been proposed for use as electrically conductive films in radiant heaters. These materials may be deposited between layers of silicone rubber, polyester film or asbestos-like paper, which are then encased in a painted, galvanized metal shell.

Devices using electroconductive films have not proved entirely satisfactory. When a metal is used in the electrically conductive material, the metal is frequently of high cost. This is particularly true of thick-film heaters based on noble metals. Heaters based on aluminum, tin oxide, indium oxide and similar materials are also costly, limited in size and restricted to low temperature use. Conductive metal powder coatings eventually develop oxides on their particulate surfaces, which raises their resistance to such a high extent that they are rendered inoperative. The electrical resistivity of electrically conductive films comprised mainly of carbon may vary with age and the conditions of use. Moreover, insulation of radiant heaters based on electroconductive films is usually difficult because it is necessary to cut into the conductive film and through the dielectric insulating cover. This raises a variety of potential problems ranging from corrosion of exposed connections, with a resulting increase in resistance, to the possibility of mechanical damage or corrosion to the interior of the heating panel.

Accordingly, there exists a need in the art for an electrically conductive laminated article useful as a radiant heater. The device should be useful at relatively low operating temperatures, such as about 250° F. or less. The article should be of a unitary structure making it unnecessary to cut or otherwise open or separate the lamina in order to install the article in its intended location. It should also be possible to make electrical connections to the article without damaging or destroying the external laminae. The article should be waterproof and substantially impermeable to moisture and harmful gases and vapors. It should have a high emissivity to ensure efficient transmission of radiant heat. Ideally, the article should be capable of producing infra-red radiation in a band width that would be subject to minimal atmospheric absorption or interference yet achieve maximum absorption by a human body. The device should exhibit a stable resistivity. Moreover, the resistivity should be controllable, reproducible and predictable. The article should be fire-resistant and safe if accidentally punctured. It should also be capable of being operated at 110 volts AC or lower voltages. The article should have good aesthetic qualities and be capable of being produced at relatively high speed using conventional equipment.

SUMMARY OF THE INVENTION

Accordingly, this invention aids in fulfilling these needs in the art. Specifically, this invention provides a unitary, composite laminated article of manufacture comprising an electrically insulating top layer having an inner surface and an outer surface. A first barrier layer substantially impermeable to moisture and water vapor substantially covers the inner surface of the top layer. An electrically insulating bottom layer having an inner surface and an outer surface is also provided. A second barrier layer substantially impermeable to moisture and water vapor substantially covers the inner surface of the bottom layer. A substantially continuous electrically conductive layer of substantially uniform thickness is interposed between the first and second barrier layers. The electrically conductive layer is comprised mainly of carbon and is capable of emitting electromagnetic radiation when an electric current is passed therethrough. Electrical conductor means are provided in contact with the electrically conductive layer. The top layer and the bottom layer have edges that are sealed together to thereby form an enclosed laminate. More particularly, the electrical conductor means are sealed inside the top and bottom layers, which have been sealed together. This results in a laminate containing an electrically conductive layer having very stable resistivity. The laminated article is particularly useful as a radiant heater.

This invention also provides a process for preparing the unitary, composite laminated article of this invention. The process comprises substantially covering an inner surface of an electrically insulating top layer having an inner surface and an outer surface with a first barrier layer substantially impermeable to moisture and water vapor. An electrically insulating bottom layer having an inner surface and outer surface is also substantially covered with a second barrier layer substantially impermeable to moisture and water vapor, wherein the second barrier layer substantially covers the inner surface of the bottom layer. A substantially continuous electrically conductive layer of substantially uniform thickness is applied to either or both of the first and second barrier layers. The electrically conductive layer is comprised mainly of carbon and is capable of emitting electromagnetic radiation when an electric current is passed therethrough. The process includes providing electrical conductor means in contact with the electrically conductive layer. The top layer and bottom layer have edges, which are sealed together to thereby form an enclosed laminate containing an electrically conductive layer having a stable resistivity.

Further, this invention provides a method of using the unitary, composite, laminated article of the present invention. More particularly, the electrically conductive layer in the article of this invention is connected to an electric power supply. An electric current is passed through the electrically conductive layer, which results in the article radiating infra-red energy.

BRIEF DISCUSSION OF THE DRAWINGS

This invention will be more fully understood by reference of the drawings in which like reference numerals identify like parts:

FIG. I is a plan view of a heating panel of the invention in a preferred three-busbar configuration comprised of a central hot line and two lateral neutral lines; the various layers are progressively peeled away to illustrate their relationship;

FIG. II is a view through section A—A of FIG. I;

FIG. III is a view through section B—B of FIG. I;

FIG. IV is a plan view of a transverse connector and middle busbar showing attachment of wire leads to a power supply;

FIG. V is a view through section C—C of FIG. I; and

FIGS. VI-A through VI-D depict optional busbar configurations.

DETAILED DESCRIPTION

Referring to FIG. I, a unitary, composite laminated article useful as a radiant heating panel is comprised of an electrically insulating bottom layer 1, such as a polyester sheet, onto which is coated a moisture and water vapor barrier layer 2. An electrically conductive layer 3 is deposited on layer 2. Adhesive layer 4 contacts the electrically conductive layer 3, and is in turn covered with a moisture and water vapor barrier layer 5, which is applied to the underside of an electrically insulating top layer 6. It will be understood that layer 4 and layer 5 can be combined into a single layer, when the single layer acts as both an adhesive and a moisture and water vapor barrier.

Busbars 7 and 8 are shown as having been laid on top of the conductive layer 3, although it is equally permissible to lay these busbars directly on top of the barrier layer 2 underneath the conductive layer 3. A transverse interconnecting line 9 between the outer busbars 8 is positioned outside the electrically conductive layer 3 so as not to interfere with the conductive paths between central busbar 7 and lateral busbars 8. Alternatively, the transverse interconnecting line 9 could be laid over the electrically conductive layer 3 if line 9 is electrically isolated from layer 3, such as by a strip of high-dielectric film. Lead wires 12 and 13 are connected to the busbars at 10 and 11.

Decorative layer 18 is an optional layer applied to either side of barrier layer 2 or on the inner surface of the top layer 6 below barrier layer 5. Since the function of the decorative layer 18 is to mask the usual black color of the electrically conductive layer 3 and the busbars 7 and 8 from view, or to match the decor of the surrounding area in which the article is used, it is between the viewer and these parts.

The water-tight, sealed construction of the laminate can be more fully appreciated from FIG. II showing a cross-section of a heating panel near one of the lateral edges of the panel. A compression seal 14 is formed by laminating under pressure or pressure and heat various layers comprising the panel. By sealing all of the exposed edges of the panel, the electrically conductive layer and internal electrical circuitry are protected from the elements. Also shown in FIG. II is a solder bead 15, which bonds the transverse connector 9 to one of the longitudinal busbars 8. Adhesive layers 16 bond the busbars 8 and 9 to the layers with which they are in contact.

In FIG. III, the build-up of layers in the laminate is shown. A partially stripped lead wire 13 is connected to central busbar 7 by means of a node of solder 11. This connection is made by heating all of the layers of the laminate above busbar 7 in the location where the solder node is to be placed. The solder is then applied and allowed to cool and solidify. The polyester film, barrier layer and adhesive layers flow back to the area of the solder node as shown at 25 and 26 in FIG. III. When these layers solidify, it has been discovered that they form a tight, waterproof seal around the solder bead 11. This ensures the integrity of the laminate and protects the electrically conductive layer and internal circuitry from the surrounding environment outside the top and bottom layers 6 and 1, respectively.

FIG. IV depicts the relationship between the electrically conductive layer 3, central busbar 7 and the clear area in which the transverse connector 9 is laid. Leads 12 and 13 can be connected to a power supply. The location of the middle busbar 7 divides the area covered by conductive layer 3 in half lengthwise, thus quadrupling the effective parallel conductive path and reducing significantly the quantity of coating material required. (See FIG. I).

FIG. V depicts the relationship between layers of a preferred laminated article according to this invention, which is particularly useful as a radiant heating panel. A bottom protective polyester layer 1 is coated on one side with a moisture and water vapor barrier layer 2 of polyvinylidene chloride. To this is then bonded a decorative coating layer 18. A laminating adhesive layer 4 is bonded to layer 18. A central busbar 7 and two lateral busbars 8 have basal adhesive layers 16 thereon. This facilitates bonding the busbars to an electrically conductive layer 3, which is shown applied to a separate thin polyester sheet 17. An adhesive layer 19 is applied between polyester sheet 17 and another polyvinylidene chloride barrier 5. Barrier layer 5, in turn, is in contact with a polyester top layer 6. Also shown in the Figure is an optional infra-red reflecting and electrical grounding layer comprised of aluminum foil 20. Foil 20 is adhered to the outer surface of top layer 6 by a laminating adhesive 22. The foil 20 is protected from damage by an additional polyester film layer 21 using a layer of adhesive 23.

The busbar arrangement can be varied to suit the desired resistivity of the coating and panel size. FIGS. I and VI-A through VI-D depict several typical busbar arrangements that can be utilized in practicing this invention. A preferred three-busbar arrangement is depicted in FIG. I. In FIGS. VI-A through VI-D the hot line is labeled as 7 and the neutral lines as 8. The transverse connector between neutral busbars is labeled 9. In the four- and five-busbar configurations, the hot line 7 also has transverse connections. These have been given the designation 9A. Where geometry causes transverse connectors to cross over busbars, the two electricity-conducting elements are electrically isolated from each other, such as by piece of high-dielectric insulating film.

In FIG. VI-A, a simple two-busbar system is depicted. In FIG. VI-B, a two-busbar system with a ground lead 24 is shown. Preferably, the ground lead 24 is connected to a metallic foil backing on the panel, such as the aluminum foil layer 20 in FIG. V. FIGS. VI-C and VI-D depict four- and five-busbar arrangements, respectively.

The various parts that make up the laminated article of this invention can now be considered in greater detail. First of all, the top layer and the bottom layer are each electrically insulating layers. They can be comprised of the same material or can be of different materials. Preferably, the top and bottom layers are each comprised of a polymeric film, especially a flexible polymeric film. Typical of such materials are films comprised of polyesters, acrylics, ABS, cellulosics, fluorocarbons, polyethylene, polypropylenes, polystyrenes, silicones, polyvinylchlorides, polyvinylfluorides, polyamides, polyimides and polyurethanes. Preferred polymeric films are polyesters. A particularly preferred polyester is polyethylene terephthalate.

The top and bottom layers can have thicknesses up to about 30 mils, but generally have thicknesses of about 0.35 to about 14 mils, preferably about 1.5 to about 7 mils. The thickness of the layers will depend upon where the laminated article is to be used. For instance, the top and bottom layer can each be about 2 mils if a panel is ceiling mounted as a radiant heating device or about 5 mils if wall mounted. The preferred range of thickness gives the desired resiliency, bending properties and resistance to tearing required for most uses.

The top and bottom layers must each be electrically insulating. These layers are characterized by dielectric strengths of at least about 1300 volts AC per mil, preferably at least about 1500 volts AC per mil. Dielectric strengths of at least about 7500 volts AC per mil are particularly preferred. Dielectric strength as referred to herein is determined according to ASTM D 149.

Typically, the top and bottom layers will exhibit volume resistivities of at least about $4.5 \times 10^{13}$, preferably about $1 \times 10^{16}$ to about $1 \times 10^{18}$. Volume resistivity is expressed as ohm - cm and is determined by ASTM D 257.

Typically, the dielectric constants for the top and bottom layers as determined by ASTM D 150 will be at least about 2.9 at $10^3$ cps, at least about 2.9 at $10^6$ cps, and at least about 2.8 at $10^9$ cps. Preferred values are at least about: 3.2 at $10^3$ cps, 3.0 at $10^6$ cps, and 2.8 at $10^9$ cps.

The particularly preferred polyethylene terephthalate polyester film employed in this invention exhibits a volume resistivity of $10^{18}$ ohm/cm$^3$ at 50% RH and 23° C., is void free and has a relatively low dielectric constant of about 2.8 to 3.2 at from $10^3$ to $10^9$ cps. It also has a very high arc resistance (121–200 seconds) when tested by ASTM D 495. It exhibits a dielectric strength of about 7500 VAC/(1-mil). These properties make it excellent for use as an electrical insulator in preventing any shock hazard thereby insuring the safety of the device when used as a radiant heater.

The mechanical properties of the top and bottom layers will depend upon the conditions to which the laminate is exposed. Generally, each of these layers will have a tensile strength (ASTM D 882) of at least about 5000 psi, preferably at least about 20,000 psi. Tear strength (ASTM D 1922) will generally be at least about 5 g/mil, preferably at least about 10 g/mil, especially at least about 20 g/mil. The percent elongation (ASTM D 882) of each layer is generally not more than about 100%, preferably not more than about 65%, especially not more than about 50%.

In a preferred embodiment of this invention, the laminated article is flexible. This invention fulfills a need in the art for a light-weight heating element that can be rolled into the form of a tube for compactness in shipping and ease of handling and installation. In this embodiment, the top and bottom layers should both be flexible. Therefore, the folding endurance for each of these layers should be at least about 400 folds, preferably at least 10,000 folds, as determined by ASTM D 2176.

The preferred polyethylene terephthalate film employed in practicing this invention provides the required percentage elongation (50 for Type S from the DuPont Co.) and folding endurance (greater than 100,000 folds).

The thermal resistance of each of the top and bottom layers will be dependent upon the conditions under which the laminate of the invention is used. If the laminate is used as a radiant heater in extremely cold climates, it is desirable for the components to resist embrittlement at the low temperatures to which it will be exposed. The preferred polyester film of this invention is capable of withstanding $-100°$ F. when tested by ASTM D 759. A preferred 1200 watt heating panel is described in greater detail hereinafter. The operating temperature of this panel generally will not exceed about 160° F. in normal operation. Other panels, however, when insulated, may attain temperatures of about 200° to about 250° F. Thus, the heat resistance for the top and bottom layers when tested by ASTM D 759 will preferably be at least about 275° F. without degradation. In certain circumstances, it may be necessary to go as high as 300° F. in order to assure long term aging resistance at maximum operating temperatures. The preferred polyethylene terephthalate film is capable of withstanding 300° F.

Since the top and bottom layers of the laminate of this invention will generally be exposed to the surrounding atmosphere in which the laminate is used, these layers should possess the required chemical resistance. Preferably, their resistance to acids, alkalies, greases, oils and organic solvents should be rated as good when tested according to ASTM D 543. This is an indication that there is no adverse chemical reaction when the films are in contact with these materials.

The top and bottom layers should also be resistant to water, and thus will exhibit water adsorption values (ASTM D 570) of about 0.8 to about 2.9% in 24 hrs., preferably less than about 0.8% in 24 hrs. Similarly, the rate of water vapor transmission (ASTM E 96-E) expressed as gm/100 sq in/24 hr/mil at 37.8° C. will be about 1 to about 5.4, preferably not more than about 1. Permeability to gases (ASTM D 1434) expressed as cc/100 sq in/mil/24 hrs/atm at 25° C. should not exceed about:

|  |  | Preferably | Especially |
|---|---|---|---|
| $CO_2$ |  50 |  25 | 15 |
| $H_2$  | 300 | 150 | 50 |
| $N_2$  |  10 |   1 |  1 |
| $O_2$  |  50 |  10 |  3 |

The top and bottom layers are bonded to each other in order to enclose the electrically conductive layer, electrical conductor means and barrier layer. Preferably, the layers are bonded by adhesive means or by heat sealing. When heat sealing is employed, heat sealing temperatures of about 200°–300° F. are preferably employed.

When the laminated article of the present invention is employed as a radiant heating panel, it is important to consider the flammability characteristics of the top and bottom layers. Preferably, the layers will be non-flammable or at least self-extinguishing as determined by ASTM D 1433-58.

Since the particularly preferred electrically conductive layer described hereinafter radiates substantial amounts of infra-red radiation in 6 to 15 micron wavelength band, the top and bottom layers preferably should transmit at least about 30% of incident radiation in this wavelength band. Polyethylene terephthalate Type S film produced by the Du Pont Co. is preferred since it meets this requirement.

Furthermore, the top and bottom layers should be selected so that their thermal coefficients of expansion are close to the thermal coefficients of expansion for the other parts in the laminate. If the thermal coefficients vary too greatly, there will be a mis-match resulting in a laminate having poor mechanical properties. The preferred polyethylene terephthalate material employed in this invention has a thermal coefficient of expansion of about $1.7 \times 10^{-5}$ in/in/°C. (ASTM D 696), which matches quite closely the thermal coefficient of expansion of the copper busbars employed. This reduces the likelihood that the copper busbars will pull away from their substrate during panel operation or when the panel is not in use.

The electrically conductive layer employed in the laminate of this invention is comprised mainly of electrically conductive carbon and is capable of emitting electromagnetic radiation when electric current is passed therethrough. As used herein, the expression "comprised mainly of carbon" means that the electrically conductive portion of the layer contains at least about 50% by weight of electrically conductive carbon. In a preferred embodiment of this invention, lamellar graphites are employed and the electrically conductive layer is capable of emitting infra-red radiation in the middle infra-red range (i.e., about 3 to about 30 microns in wavelength). It is employed in a layer of substantially uniform thickness, which is critical in order to ensure uniform electrical and thermal characteristics in the layer.

Preferred for use in the conductive layer are the electrically conductive compositions disclosed in U.S. Pat. No. 3,923,697 to Harold Ellis, the entire disclosure of which is relied upon and incorporated herein by reference. The patent discloses an electrically conductive composition comprising a particulate, homogeneous blend of:

(A) About 60% to about 98% by weight of graphite;
(B) About 1.5% to about 20% by weight of manganese dioxide; and
(C) About 0.5% to about 20% by weight of zinc oxide, based on total weight of the blend.

The graphite constitutes the major electrically conductive component. The manganese dioxide acts as a resistive component and counterbalances the negative temperature coefficient of resistance (TCR) of the graphite. The zinc oxide is a semi-conductor and stabilizer and improves chemical and physical properties of the particulate blend and coatings in which the blend is employed. Therefore, within these broad ranges of percentages, specific proportions for a given application can readily be determined with a minimum of experimentation.

Preferably, the graphite is highly carbonized and the graphite particles are lamellar, flat plates. The lamellar structure has been found to be associated with a high degree of conductivity. The requirements for the type and grade of manganese dioxide and zinc oxide are not critical.

Additional conductive agents and electron donors, such as AgCl, $SnCl_4$ and the like can be added in quantities ranging from about 0.5% to about 5.0% by weight based on total particulate material.

Preferably, the electrically conductive composition comprises a balanced mixture of crystallite graphite particles in which the majority of particles are relatively large (a mean effective size ranging around 30–50 microns), and the interstices between these particles occupied by smaller-size graphite crystallites with a mean particle size ranging around 6–8 microns. A photovoltaic/photoconductive grade of zinc oxide commonly used in electrophotography is preferred because it acts as a semi-conductor and electron donor under the conditions of current flow. Battery grade manganese dioxide functions as the balancing resistive component, while yielding electrons in an electron-donor relationship with the other components of the mixture.

A preferred particulate blend of ingredients comprises:

(A) About 88 to about 94 weight percent graphite;
(B) About 4 to about 8 weight percent manganese dioxide; and
(C) About 0.7 to about 3 weight percent zinc oxide. A particularly preferred pigment formulation, hereinafter referred to as the S-3/1 composition, is:

S-3/1 COMPOSITION

Lamellar graphite, 34μ mean size, 356 parts by weight
Lamellar graphite, 8μ mean size, 94 parts by weight
Manganese dioxide, 30 parts by weight
Zinc oxide 6 parts by weight.

In this particularly preferred formulation, the mixed graphites, in a 79:21 ratio by weight, but a 3:1 ratio by volume, total 92.6% by weight, while the $MnO_2$ constitutes 6.2% and the ZnO constitutes 1.2% by weight of the formulation.

The 34μ and 8μ lamellar graphite is supplied by LONZA, LTD. of Fairlawn, N.J., under the grade designations KS-75 and KS-15, respectively. The manganese dioxide is supplied by KERR-McGEE CHEMICAL CORP., Oklahoma City, Okla., as Standard Battery Grade 5 B. The zinc oxide is supplied by NEW JERSEY ZINC CO., Bethlehem, Pa., under the grade designation "PHOTOX 80".

Because of the need for a highly flexible conductive coating capable of withstanding, without cracking, the stresses of flexing and being rolled during its manufacture, shipping and installation, a highly flexible binder system for the S-3/1 conductive pigment is provided. It is based on an acrylic resin resistant to high temperatures. The following composition is one formulation suitable for silkscreen application through an 80-mesh screen:

X-1-800 CONDUCTIVE COATING FORMULATION

|  | Pounds |
|---|---|
| Bentone LT (N.L. Industries, Hightstown, N.J.) | 4.0 |
| Propylene glycol | 202.7 |
| Water | 333.0 |
| Phenyl mercury oleate (PMO-30) (Troy Chemical, Newark, N.J.) | 0.6 |
| Triton CF-10 (Rohm & Haas, Philadelphia, Pa) | 7.5 |
| NxZ Defoamer (Diamond Shamrock Process Chemical Div., Morristown, N.J.) | 5.0 |
| Tamol 850 (Rohm & Haas) | 6.6 |
| Latex Anti-crater (LAC) (Troy Chemicals) | 4.5 |
| Tamol 731 (Rohm & Haas) | 15.3 |
| Ammonia (28%) | 2.9 |
| Versacryl 763 (Johnson Wax Co., Racine, Wis.) | 356.4 |
| S-3/1 Conductive Pigment | 591.0 |
| Carbitol Solvent (Union Carbide, New York, N.Y.) | 9.0 |
| Balab 748 Defoamer (Witco Chemical Corp. New York, N.Y.) | 10.5 |
| Potassium Tetrapyrophosphate (KTPP) | 5.4 |
| TOTAL WEIGHT (POUNDS) | 1,554.4 |
| Gallons | 145.27 |
| Weight per Gallon | 10.7 lbs. |
| Viscosity | 94 KU (=1260 CPS) |
| Total Solids (Non-volatives) | 46.8% by weight |
| Pigment Binder Ratio (PBR) | 81.2% by weight |

The composition, in essence, consists of an acrylic resin of excellent binding properties (hence its ability to hold a high loading of conductive pigments), relatively high temperature resistance, great flexibility and relatively low volumetric electrical resistivity. The resin when cured is a thermoplastic acrylic resin having a 50 to 100% elongation. The acrylic is best described as a resin-supported acrylic emulsion solubilized by ammonia with ethylene glycol as a plasticizer and a molecular weight of about 200,000. Other acrylics can be substituted in the form of aqueous colloidal dispersions, emulsions or latexes. Numerous acrylics are also available in the form of solutions in any of a wide variety of solvent systems, and although the preferred formulation is that of an aqueous-based coating, solvent-based coatings are equally usable in the form of either thermoplastic or thermosetting compositions. Indeed, solvent-based systems are simpler in formulation, since they do not require the range of formulation aids and adjuvants required by aqueous-based systems, they adhere more tenaciously to polymeric film substrates, and the resins generally show still lower volumetric resistivities, thus requiring lesser quantities of conductive pigment to achieve the same resistance per square.

Likewise, as indicated in U.S. Pat. No. 3,923,697, suitable formulations can be compounded with other polymer or resin systems, whether thermoplastic or thermosetting, organic or inorganic, depending on the preferred design and operating conditions. Naturally, combinations of polymers can likewise be employed in the binder system.

The X-1-800 formulation disclosed herein has its viscosity adjusted to that suitable for silk-screen application. Other methods of application well known in the art can be employed and would require only minor modification to the viscosity.

There are various modifying or adjuvant ingredients in the formulation; e.g., suspending agents to prevent settling of the conductive pigments during storage and use; dispersants to prevent pigment agglomeration and ensure uniform distribution; wetting agents (surfactants) to assure complete encapsulation of the pigment by the resins and modify surface tension or Van der Vaal forces to thereby ensure smooth flow during application; antifoaming agents to prevent the objectional formation of foam during processing, ensure complete de-aeration in the bulk liquid coating and eliminate air globules or "fish-eyes" in the deposited film; coalescing agents to ensure film integrity without voids, pH modifiers and buffers to prevent coagulation and ensure the proper ionic milieu in which the other surface active materials can operate under optimum conditions; aqueous solvents compatible with the resin system to ensure that the resin will not prematurely precipitate; "in-can" and film preservative and biostatic agents; and water as the system carrier and fluidity/viscosity controller. Most of the adjuvants are evanescent and volatile and leave the formulation during the drying or curing of the coating. Those which are non-volatile add to the solids composition of the film and reflect in the final electrical resistivity, thus influencing the required laydown thickness of the electrically conductive layer to achieve the desired goal. The preferred formulation is only one of many possible formulations.

To illustrate one of the numerous variations possible, following is an example of a suitable aqueous base acrylic formulation for a curtain-coating application, which yields the same resistance in ohms per square under the same curing and laminating conditions as the silkscreen formulation X-1-800, cited above:

X-1-49 CONDUCTIVE COATING FORMULATION

|  | Pounds |
|---|---|
| Bentone LT | 7.0 |
| Propylene glycol | 75.0 |
| Water | 360.0 |
| CMP acetate | 0.6 |
| Triton CF-10 | 1.5 |
| Defoam 999 (Troy Chemicals Co., Newark, N.J.) | 4.0 |
| Tamol 850 | 6.6 |
| Latex Anticrater (LAC) | 4.5 |
| Tamol 731 | 3.3 |
| Ammonia (28%) | 3.0 |
| Versacryl 763 | 148.0 |
| Airflex 120 (Air Products & Chemicals Co., Allentown, Pa.; A 52% solids latex vinyl-ethylene emulsion) | 146.0 |
| S-3/1 Conductive Pigment | 534.0 |
| Carbitol Solvent | 9.0 |
| TOTAL WEIGHT (POUNDS) | 1,647.5 |
| Gallons | 157.6 |
| Weight per Gallon | 10.45 lbs. |
| Viscosity | 76 KU (=760 CPS) |
| Total Solids (Non-Volatiles) | 40.16% by weight |
| Pigment Binder Ratio (PBR) | 80.7% by weight. |

One of the problems encountered with laminated articles having electrically conductive layers comprised mainly of carbon is that the electrical resistivity of the electrically conductive layer varies over a period of time in different types of environments. This is unacceptable when the articles are used as radiant heaters. Specifically, such heaters must usually be approved or certified by recognized testing laboratories or by government agencies. One of the requirements is that resistivity be maintained within relatively narrow limits over extended periods of time. Even the particularly preferred electrically conductive composition employed in this invention exhibited too wide a variation in electrical resistivity for most applications when sandwiched between the preferred polyethylene terephthalate sheets.

It was discovered that stable resistivities could be achieved by applying a barrier layer to the inner surfaces of the top and bottom layers surrounding the electrically conductive layer. The barrier layers are substantially impermeable to moisture and water vapor and substantially cover the inner surfaces of the top and bottom layers. It has surprisingly been discovered that this results in the electrically conductive layer exhibiting very stable resistivities over substantial periods of time when the electrically conductive layer is sealed within the enclosed laminate of this invention.

Preferably, the barrier layers are polymeric materials, flexible and are independently selected from materials having a water vapor transmission rate (ASTM E 96 E) not exceeding about 0.5 grams/100 sq. in./24 hr./mil at 37.8° C., preferably about 0 grams/100 sq. in./24 hr./mil at 37.8° C.

Typically, the moisture vapor barrier has a thickness of about 0.1 to about 0.5 mils, preferably about 0.1 to about 0.3 mils. It is particularly preferred that the vapor barrier be safe in a solvent vapor or explosive atmosphere and be non-flammable, although slow-burning or self-extinguishing barriers can be tolerated for most applications. Flammability characteristics are determined by ASTM D 1433.

The particularly preferred material for use as the barrier layer is polyvinylidene chloride. This material can be deposited as a 0.1 to 0.2 mil thick layer from a polymer latex emulsion, a polymer melt or as an extrusion or co-extrusion with the top and bottom layers. The barrier layer can be deposited onto the inner surfaces of the top and bottom layers by any of a variety of methods, such as curtain coating, knife blade coating, roller and reverse roller coating, gravure coating, silk-screen coating and similar methods. Other materials can also be employed, such as polyethylenes, fluorocarbons, silicone resins, polypropylene, polyamides and similar polymeric materials that are substantially impermeable to moisture and water vapor.

The use of the barrier layer makes it possible to employ the article of this invention in a wide variety of environmental conditions. The article can be employed in very moist or humid conditions without adversely affecting the electrical properties of the conductive layer. Similarly, the laminated article is substantially protected from potential hazards posed by gases that could otherwise attack the electrically conductive layer and its electrical components. Moreover, it can be operated without flames or hot spots in a moisture-laden atmosphere or in an area containing a potentially explosive atmosphere, such as dust-laden warehouses and grain storage areas.

In another preferred embodiment of this invention, the electrically conductive layer is adhesively bonded to the barrier layers, and the barrier layers, in turn, are in adherent contact with the inner surfaces of the respective upper and lower layers. The adhesive layer should be substantially non-flammable or at least self-extinguishing, very flexible, thermoplastic or thermosetting, resistant to high temperatures, non-blocking and free of out-gasing. The adhesive layer can be applied in single or multiple coats. Particularly preferred adhesives for use in the present invention are Polyester Adhesive #46923 or #46971 of the E. I. DuPont Co. or DuPont[Teflon-based]adhesive #6880. Adhesive layers will generally have a thickness of about 0.1 to about 0.5 mils, preferably about 0.1 to about 0.3 mils, but other thickness can be employed.

In general, the adhesive should be able to bond the dissimilar layers in which it is in contact; to withstand prolonged exposure to operational temperatures without degrading, outgasing, discoloring or relaxing its tensile bond strength; to stretch under the stresses imposed by the coefficients of expansion of the various layers while still maintaining bond integrity; to form a bond under contact pressure (and heat) after being air dried; be non-blocking (that is, the adhesive on the substrate rolls dries tack-free so that the polyester film can be rolled into a tube for shipping and handling; and not migrate into the conductive coating after lamination.

The color of the electrically conductive layer is generally black, which in some situations, such as residential comfort heating, may be objectionable. Furthermore, depending on the direction of the mounting, the electrically conductive busbar system may likewise be visually or esthetically objectionable. In this event, a decorative coating layer can be interposed between the objectionable layers and the viewer. This layer can be white or of any color, hue or saturation, and can be solid, patterned, iridescent, fluorescent or phosphorescent. The decorative layer generally has a thickness of about 0.2 to about 1.5 mils, preferably about 0.3 to about 0.5 mils, but other thickness can be employed. Preferably, it is flexible. It is also preferred that the decorative layer be non-discoloring, non-out-gasing, possess a coefficient of expansion approximately that of the conductive coating, and that its emissivity be at least 0.90.

To protect the decorative layer from scratches and the effects of air oxidation and other aging or environmental deteriorations, this layer is placed underneath either the top or the bottom film layers. Most appropriate is application on top of the barrier layer. The conductive layer could be placed on top of the decorative layer or an adhesive layer could be interposed between the decorative layer and top or bottom layer. Either system can be used, and the former system interposes one less layer (the adhesive layer) through which the infra-red radiation must traverse on its passage to the front. The latter system permits operational inventory advantages in that the type of decoration does not have to be committed until the final assembly of the top and bottom halves.

The use of the solid state electrically conductive laminate in a radiant heating panel will now be described in greater detail. More particularly, one embodiment of this invention provides a radiant and conductive heater with a 1200-watt output, from a coated area of 24.35 ft$^2$; that is, a unit with a conductive layer of X-1-800 deposited on an area 83½" long by 44" wide on a 4'×8' polyethylene terephthalate film. When applied by a silkscreen method through an 80-mesh screen, laminated under pressure and temperature as hereinafter taught, 32 mg. per in$^2$ of X-1-800 formulation yields a coating exhibiting a resistivity of 96 ohms per square. When connected in a three-busbar format as shown in FIG. I, that is, parallel lines 8 20.875 inches apart, the resulting overall panel resistance is 12 ohms, thus drawing 10 amps on 120 volts, giving the desired 1200-watt output. The thickness of the electrically conductive layer to achieve 96 ohms per square using the X-1-800 formulation is 1.52 mils.

There is an inverse linear relationship between the weight of the electrically conductive layer and the resulting resistivity, and also between laminating pressure and temperature to which the layer is subjected. Thus, in order to achieve lower resistivity (ohms per square), such as would be required for a heating element producing a higher wattage output than the 1200-watt unit, a heavier deposition of the conductive layer is required. Conversely, to achieve a lower wattage output, a higher ohms per square is permissible requiring a smaller amount of conductive layer. There is also a direct, but inverse, curvilinear relationship between the concentration of conductive pigment in any given conductive coating formulation and the resulting ohms per square. That is, increasing the weight of pigment per volume of coating material reduces the resistivity for any given thickness of coating, and thus reduces the overall quantity of coating material required to achieve a given resistance.

For the 1200-watt output panel previously mentioned, a silkscreen application which deposits 9.84 g of X-1-800 wet coating formulation per square foot, with a laminating pressure of 400 psi, at a maximum curing temperature of 270° F. for 15 min. yields the required 96 ohms per square. Merely air-drying that quantity of coating material without the application of heat or pressure results in an average of 1250 ohms per square. Heat alone, at 270° F., with no pressure, reduces the resistivity to 480 ohms per square. Pressure alone yields 550 ohms per square. Increasing the pressure above that selected for operating conditions continues to reduce the resistance to below 96 ohms per square, but with the possibility of damaging, through a shearing action, the delicate busbar-to-coating interface, thus breaking the continuity and opening the contact area to possible arcing and eventual failure of the panel. Increasing the laminating heat or prolonging the time of application of the heat, may result in partial pyrolysis of the resin binder system and potential damage to the top, bottom and intermediate layers.

The selection of power output is a matter of choice. In the preferred embodiment described herein, the 1200-watt output panel previously described produces 49.6 watts/ft$^2$ and the panel has a safe-to-touch surface temperature of 125° F., depending on the backup insulation utilized. At this temperature, the electrically conductive layer has a high emissivity ($\epsilon=0.95$), and the infra-red radiation peaks at about 8 to 9 microns wavelength. It is to be understood that this 1200-watt output is the preferred, but not limiting, design for an 8'×4' panel. A panel of this size has the capability of producing a controllable power output of from 300 to 3500 watts. At the high end, the surface temperature would be 235° F.

The higher the wattage output per heater, the fewer the number of heaters that would be required for any given heating requirement, so that two 3500-watt heaters, totaling 7,000 watts in output, would have the same radiant or conductive power as 5.8 1200-watt units. These apparent benefits must be viewed against the fact that the mean wavelength of the radiation at this higher power peaks at around 7.5 microns, a band in which the humidity and some of the gases in the atmosphere show a higher absorption. Concomitantly, there is a decreased effectiveness of that wavelength in human skin absorption, and depending on the conductive formulation used, possibly a shortened life duration, as well as other aging effects on other components of the system. However, depending on application, wattage density is a matter of choice.

Busbars in parallel are utilized to conduct electricity along the length of the electrically conductive layer to present an equidistant path of resistance to the passage for the electric current. Metal foil busbars are generally employed for thin coatings, but wires or bars, etched copper claddings, and even vapor-deposited or painted metallic coatings can be employed. Any of numerous types of metal foils can be employed, including aluminum, lead, stainless steel, silver, brass, bare copper or tin-plated copper and the like.

In the preferred panel described herein, copper foil tape is utilized as the busbar material because of its high conductivity and malleability. The tape can be bare copper without adhesive, in which case it is laid directly into the conductive coating that is utilized as the adhesive. Preferably, the tape is backed with a high temperature adhesive to adhere it to the substrate. In one form of tape utilized in the practice of this invention, a copper foil tape carried a 0.1-mil thick layer of high temperature acrylic contact adhesive. The foil can be applied either underneath the conductive layer, i.e., directly onto either the barrier layer or the decorative layer, or on the top of the conductive layer. When laminated under pressure, the acrylic adhesive offers little resistance to the flow of current. It is important to note that the thickness and behavior of the adhesive under pressure should be investigated for any tendency to bleed into the busbar-conductive layer junction, where it may cause interfacial problems. The heater of the preferred design described herein utilizes copper foil 0.001 inches thick, by 0.750 inches wide, to carry the complete 1200-watt load. It was discovered that under full current, the copper busbars of this design do not heat significantly above ambient temperature, and thus can safely be employed.

In a 44" wide by 88" long coated area panel, to obtain a 1200-watt output with only two busbars 44" apart (FIG. IV-A) on 120 volts AC, requires an overall panel resistance of 12 ohms and 24 ohms per square. With the preferred 3 busbar configuration (FIG I), the busbars are only 22 inches apart, while the conductive path has been doubled to 176 inches. The overall panel resistance remains at 12 ohms, but the permissible ohms per square of the conductive layer has been increased to 96. With 4 parallel busbars (FIG. IV-C), the width between busbars is decreased to 14⅔ inches, and the parallel path length is increased to 264 inches, and since the overall ohmage remains at 12 ohms, the allowable ohms per square is now increased to 216. Similarly, with the use of five (5) parallel busbars (FIG. IV-D), the busbars are now placed 11 inches apart, and the circuit path length has been increased to 352 inches, resulting in a permissible increase in resistivity to 384 ohms per square; while the overall panel resistance remains at 12 ohms.

Thus, depending on the busbar configuration, the quantity of the conductive layer per panel can be reduced by up to 75% or 80% from that required in a 2-busbar system. While the preferred design disclosed herein shows a 44"-wide panel with 3 busbars, more busbars make it possible to fabricate wider panels. However, since multiple busbar systems require additional manufacturing steps and increase the chance for accidental puncture through a busbar, a trade-off must be made in each design to optimize the busbar configuration.

With the preferred particulate blend employed in the electrically conductive layer, at a panel operating temperature of 120° F., about 60% of the infra-red waveband emitted ranges from 8 to 15 microns; at a 150° F. operating temperature about 75% of the waveband covers 6 to 18 microns. The various layers in the laminate should be selected to pass the radiation in the particular waveband.

Soldering is the preferred manner of connecting the busbars to power supply wiring. It has been determined that the preferred soldering method (FIGS. III and IV) introduces only a 0.003-ohm resistance across the junction, and, in addition, does not destroy the integrity of the panel seal. Furthermore, this preferred method of connection can be accomplished in-plant under quality controlled conditions, and not left to the vagaries of field installation.

In the preferred heater panel design (FIG. I), only two wires are required. Where a ground or third wire is utilized, this can be connected to the dielectrically isolated metal foil reflector layer (see FIG. VI-B and infra) either by soldering or through the use of any of the other types of terminals well known in the art.

In another embodiment of this invention, an infra-red reflective metallic layer is provided on the exterior of the laminated article. A variety of materials can be employed for this purpose. An aluminum foil reflective layer is preferred because of its ability to reflect infra-red energy in the 6 to 15 micron range. Use of a reflective layer in this manner minimizes heat transfer to the back supporting insulating structure as well as maximizes the forward drive of radiation. A soft 0 temper aluminum foil is preferred. Other polished metal foils as well as a variety of deposited metal films, e.g., vacuum-deposited aluminum, silver and gold, can also be employed. Highly polished chrome or stainless steel foils can also be utilized.

Preferably, the reflective layer is isolated from the electrically conductive layer by a high dielectric polyester film to which the reflective layer is laminated by a high-temperature resistant adhesive, such as a polyester or silicone adhesive. To protect the thin and delicate reflective layer from damage, such as abrasion, another layer of polyester film is laminated to the exposed surface using an adhesive. This effectively encapsulates the reflective layer in a high dielectric envelope.

In a unique aspect of this invention, the metallic layer is a substantially continuous, electrically conductive metallic layer, usually flexible, which can be incorporated into the laminate and dielectrically insulated from the conductive layer and the conductor means in the laminate, and utilized as an electrical ground to prevent shock hazard should dielectric protection provided by the thin polymer films be disrupted, such as by a pointed object. Specifically, the metallic layer acts as a ground if it is short-circuited to the conductive coating. Shock hazards can be minimized, for example, by either connecting the metallic layer to the ground lead in a three-wire system or to a ground fault interruptor in a manner well known in the art. The metallic, reflective layer materially adds to the safety of the heating panel, especially when there are no readily noticeable penetrations of the dielectric layer and conductive coating. If a panel having a metallic layer is mounted on a non-insulative surface, the heat received by the foil will be drawn off at once. A panel of the preferred design is reversible, that is, it would be expected to produce heat from both the front and rear surfaces. The removal of heat from the rear surface having the metallic layer can be reduced by backing the panel with an insulation, or by separating the metallic layer from the panel by a dead air space, or by placing the metallic layer behind insulation on the supporting substrate.

A preferred spatial relationship of aluminum foil and its dielectric insulating layers is shown in FIG. V. To isolate the aluminum foil from contact with the copper busbars in those areas at or through which electrical connection terminals must be made, the aluminum foil is cut out or indexed. The indexes can also be provided at the ends of the panel under the busbars to ensure against possible arcing between the end of the copper busbar and the aluminum foil.

A ground wire is connected directly to the aluminum foil by terminal crimps or other suitable connecting means punctured directly through the layer of polyester film and the single foil layer. Since this connection is made outside the top and bottom layers surrounding the conductive layer, the integrity of the laminated article is not disturbed.

Because of the proximity of the aluminum foil to the conductive layer (separated only by a dielectric polyester film layer), a capacitance effect is inevitable when the panel is energized. This has been measured in panels of various design configurations and approximates 0.9 microfarads in the 1200-watt panel. It has been discovered that advantage can be taken of this capacitance as a power factor correction leading to a slightly less overall power drain in the system. Where many panels are utilized in a building, there will be a noticeable "lead-lag" effect balancing the power surges induced by motors, transformers, and the like. The improvement in the power factor is due to the capacitance power of the panels to absorb or cancel the magnetically induced reactive or phantom power (KVAR) of the magnetizing forces of the inductive loads in the power system.

In addition, when the 1200-watt panel is energized with 120 volts AC and a ground lead has been connected to the aluminum foil, a capacitive coupling leakage current of 20 milliamps ±2 milliamps is registered. This combination of capacitance effect and leakage makes it impractical to run an AC dielectric check on the completed heaters, although a DC dielectric check is not influenced by this phenomenon. Current leakage due to capacitive coupling is not necessarily a shortcoming in panel design, since test standards allow leakage on exposed ground wires. On non-exposed wire, such as in the heaters of the present invention, the allowance is higher and the panels fall within permissible ranges. Using a thicker middle dielectric film layer reduces the capacitive current leakage. Advantage can be taken of the capacitive current leakage in the design of a back-up protective circuit in which changes in the current leakages accompanying damage to the panel, such as a puncture penetrating the conductive layer and/or the foil layer, trigger a variety of types of warning sensors or a fast-acting fuse or switch that cuts off the power to the panel.

Mounting the laminate in the form of a heating panel to a variety of substrates can be accomplished in a number of ways. For example, the panel can be surrounded by a frame and the frame attached by fasteners to a substrate. The sealed edges surrounding the conductive area of the panel can be stapled directly to the substrate. The panel can be backed with a high-temperature-resistant contact adhesive that will ensure smooth attachment.

The flexible laminate of this invention can be curved into an arc or a complete circle. The design of this laminate permits openings to be cut, of an geometric shape, into the radiant area to accommodate decorative, structural, assembly and mounting requirements. These openings are best designed into the production process to avoid violating the integrity of the laminate, and can be accomplished with the loss only of the wattage output represented by that percentage of the area interrupted between the nearest bushbar pairs.

The manufacturing operation is essentially that of a coating and laminating procedure. Fabrication consists of separately forming two subassemblies, termed A and B, one containing the conductive layer, and the other the dielectrically insulating cover. The two subassemblies are then laminated with an intermediate adhesive layer under pressure, or heat and pressure, to form the laminate. Since the two subassemblies are similar, the conductive coating layer can be applied to either A or B, and the optional decorative coating layer, also, can be applied to either subassembly. The optional infra-red reflecting metallic foil can be provided by means of a subassembly C, which in turn is mated with the base of either A or B in a similar laminating operation.

The particularly preferred heating panel having 1200 watt output can be prepared as follows. A roll of 2-mil thick polyethylene terephthalate polyester film (Mylar Type S from E. I. duPont de Nemours and Co.) 49 in. wide to allow leeway for final trimming is provided. A polyvinylidene chloride barrier layer having a thickness between 0.1 and 0.2 mil is roller coated on one side of the polyester film. The barrier layer is force dried. The coated polyester film is then cut to form sections, each 96" long.

On one of the coated sheets, the electrically conductive layer is formed by silkscreening the X-1-800 formulation having the S-3/1 pigment uniformly dispersed therein through an 80-mesh screen at a rate of 32 mg/in$^2$. The electrically conductive layer is of substantially uniform thickness (1.52 mils) and covers a rectangular area 83.5 in. long by 44 in. wide. The resulting article is force dried to remove solvents and moisture, and busbars are then applied in the configuration shown in FIG. I. The busbars are copper foil 0.75 in. wide by 0.001 in. thick with the middle busbar centered on the panel and the 2 outer busbars spaced equidistant from the middle busbar and parallel, 20.875 in. from the middle busbar. The transverse busbar is isolated from the center busbar by a clear space of polyester film. The copper foil has an acrylic adhesive on one side, which is placed in contact with the conductive layer and pressed tightly with a roller. The busbars and transverse connector are soldered together. The resulting article comprised of polyester film, polyvinylidene chloride barrier layer, conductive layer and busbars is hereinafter referred to as subassembly A.

Another subassembly is prepared in a manner similar to subassembly A, except that the busbars and conductive coating are omitted. An adhesive layer having a thickness of 0.1 to 0.3 mils is applied over the polyvinylidene chloride barrier layer and allowed to dry until it is tack-free. The resulting article is hereinafter referred to as subassembly B.

Subassemblies A and B are aligned and mated so that the adhesive layer of subassembly B contacts the busbars and conductive layer of subassembly A. The resulting structure is then placed in a heated flat bed laminating press, and laminated at 400 psi and 255° to 270° F. for 15 min.

If a reflective, metallic foil layer is to be included in the final laminate, this can be achieved as follows. The third 96"-long sheet of polyester is provided with a layer of adhesive, which is then covered with an 0-temper aluminum foil having a uniform thickness between 0.35 and 1.5 mils and at least one shiny surface. Cutouts in the foil are provided around the areas where power supply wiring is to be attached to the busbars and transverse connectors. Another adhesive layer is applied over the exposed surface of the foil. The resulting article is hereinafter referred to as subassembly C. Subassembly C is then mated and adhesively bonded to the polyester film layer that formed part of subassembly A.

If a decorative layer is employed, it can be applied between the polyvinylidene chloride layer and the adhesive layer of subassembly B before B is mated with subassembly A. The type of decorative layer, e.g., liquid or solid, will determine whether drying or thermal curing are required.

The panel can be trimmed to size. Wire pigtails can be provided by soldering short lengths of stripped #14 THHN stranded copper wire through the polyester sheet directly onto the busbars as shown in FIG. III. The junction is self-sealing by the melted polyester/polyvinylidene chloride/adhesive solidifying around the solder node.

A static ohmage reading is taken to insure that the resistance falls within the projected ranges.

The panels are then put individually on electrical load, and the dynamic resistance and power output is checked through a "burn-in" period running from 15 to 30 minutes.

What has been described above is a novel laminated article that is especially useful as a radiant, convective and conductive flexible heater, and a supported conductive coating with unique features. The article of this invention is also useful for signalling, information transmission, status reporting, transmitting an electrical current and providing electrical continuity. One feature is the highly stable conductive film layer in the laminate, which is made possible by the use of a barrier layer underlying and overlying the conductive layer. A further feature is the use of an optional decorative pattern layer covering the black color of the electroconductive element. Still another feature is the use of multiple busbars and variable geometry circuitry layouts to achieve optimal electrical operating characteristics and panel size. Other features are the capability of the heater to be curved into a variety of shapes; the ability of the heater to radiate equally in both directions, front and rear, and thus serve two areas simultaneously; the capability of withstanding excisions or removal of sections of any geometric shape, with minor losses in power output. Still another feature is the optional reflective metallic foil, or vapor-deposited metallic layer, on the backside of the panel. This rear reflective surface can be used both as a highly-efficient infra-red reflector and as an electrical ground for the panel. Additional features are the use of 110–120 volts AC operating power, and the achievement of a very high infra-red emissivity ($\epsilon$), greater than 0.95, indicating a high effectiveness in transmitting radiant heat. All elements of the conductive system are permanently sealed within a water- and vapor-tight envelope at the time of manufacture and do not require subsequent opening or penetration of the seal at installation. Furthermore, it is possible to use solder, including pre-forms and/or conductive adhesives as a method for joining the busbars to the electrical connectors within the polymer laminate. An additional feature is the soldering of the connecting wiring or other wiring to the busbar system through protective layers of the laminate without disturbing the integrity of the laminate. The laminate can be used as a radiant heater at operating temperatures of 250° F. or less. The electrically conductive layer in the laminate exhibits a resistivity that is very stable, predictable, controllable and reproducible.

What is claimed is:

1. A unitary, composite, laminated article of manufacture comprising:
   (A) an electrically insulating top layer having an inner surface and an outer surface;
   (B) a first barrier layer of polymeric material having a water vapor transmission rate (ASTME 96) not exceeding about 0.5 g/100 sq.in./24 hr/mil at 37.8° C., wherein said first barrier layer substantially covers said inner surface of said top layer;
   (C) an electrically insulating bottom layer having an inner surface and outer surface;
   (D) a second barrier layer of polymeric material having a water vapor transmission rate (ASTME 96) not exceeding about 0.5 g/100 sq.in./24 hr/mil at 37.8° C., wherein said second barrier layer substantially covers said inner surface of said bottom layer;
   (E) a substantially continuous, electrically conductive layer of substantially uniform thickness between said first and second barrier layers, wherein said electrically conductive layer is comprised mainly of carbon and is capable of emitting electromagnetic radiation when an electric current is passed therethrough;
   (F) electrical conductor means in contact with said electrically conductive layer;
   wherein said top layer and said bottom layer have edges, which are sealed together to thereby form an enclosed laminate containing an electrically conductive layer having stable resistivity.

2. Article according to claim 1 wherein said laminate is flexible.

3. Article according to claim 2 in which:
   (A) said top layer and said bottom layer are independently selected from smooth, flexible polyester films having a uniform thickness of about 0.35 to about 14 mils, a dielectric strength (ASTMD 149) of at least about 1300 volts AC per mil and an infrared radiation transmission greater than about 30%;
   (B) said electrically conductive layer is comprised mainly of lamellar graphite and is capable of emitting infrared radiation in the middle infrared range when an electric current is passed therethrough; and
   (C) said electrical conductor means comprises at least two flexible metallic wires or busbars.

4. Article according to claim 3 in which:
   (A) said top layer and said bottom layer are each comprised of a flexible polyethylene terephthalate film having a thickness of about 1.5 to about 7 mils and a dielectric strength (ASTMD 149) of at least about 1500 volts AC per mil;
   (B) said first and said second barrier layers are each comprised of polyvinylidene chloride;
   (C) said electrically conductive layer is comprised of a particulate phase containing about 60% to about 98% by weight of graphite; about 1.5% to about 20% by weight of manganese dioxide; and about 0.5% to about 20% by weight of zinc oxide; and
   (D) said busbars are comprised of copper foil.

5. Article according to claim 2 having a substantially continuous, electrically conductive, flexible metallic layer over at least one of said outer surfaces and means for connecting said metallic layer to an electrical ground.

6. Article according to claim 5 in which said metallic layer is aluminum foil.

7. Article according to claim 4 in which said electrically conductive layer is adhesively bonded to said first and said second layers, and each of said barrier layers are in adherent contact with its adjacent upper or lower layer.

8. Article according to claim 3 in which said electrically conductive layer emits infra-red radiation having a wavelength of about 6 to about 15 microns and said conductive layer is comprised of a particulate phase consisting essentially of about 88 to about 94 weight percent graphite, about 4 to about 8 weight percent $MnO_2$ and about 0.7 to about 3 weight percent $ZnO_2$.

9. Article according to claim 6 in which said aluminum foil layer is adhesively bonded to said outer surface of said top layer, and said aluminum foil layer has adhesively bonded thereto a flexible, protective, film layer.

10. Article according to claim 4 in which a flexible, decorative film layer is interposed between said electrically conductive layer and said upper or said lower layer.

11. Use of the article of claim 1 comprising connecting said electrically conductive layer to an electric power supply, and passing an electric current through said conductive layer.

12. Use of the article of claim 6 comprising:
    (A) connecting said electrically conductive layer to an electric power supply;
    (B) connecting said aluminum foil to an electrical ground; and
    (C) passing an electric current through said electrically conductive layer.

13. Article according to claim 3 in which the metallic busbars are multiple even or odd numbers running parallel the length of the conductive coated area interconnected to form continuations of the hot and return lines of the power source.

14. Article according to claim 1 wherein said article is made in a shape having first and second perpendicular axes, and said electrical conductor means comprises
   a. a first conductor substantially parallel to said first axis and adjacent one edge of said article;
   b. a second conductor substantially parallel to said first axis and adjacent another edge of said article.

15. Article according to claim 1 wherein said article is made in a shape having first and second perpendicular axes and said electrical conductor means comprises
  a. a first conductor having a first leg substantially parallel to said first axis, a second leg substantially parallel to said second axis and a third leg substantially parallel to said first axis, said first and third legs being adjacent opposite edges of said article and electrically connected only through said second leg,
  b. a second conductor substantially parallel to said first axis and substantially equidistant from said first and third legs of said first conductor.

16. Article according to claim 1 wherein said article is made in a shape having first and second perpendicular axes and said electrical conductor means comprises
  a. a first conductor having a first leg substantially parallel to said first axis, a second leg substantially parallel to said second axis and a third leg substantially parallel to said first axis, said first leg adjacent one edge of said article and said third leg spaced from said first leg,
  b. a second conductor having a fourth leg substantially parallel to said first axis, a fifth leg substantially parallel to said second axis, and a sixth leg substantially parallel to said first axis, said fourth leg adjacent the edge of said article opposite said first leg of said first conductor and said sixth leg spaced from said fourth leg and being substantially equidistant from said first and third legs and said third leg being substantially equidistant from said fourth and sixth legs.

17. Article according to claim 1 wherein said article is made in a shape having first and second perpendicular axes, and said electrical conductor means comprises
  a. a first conductor having first, second, and third legs substantially parallel to said first axis, said first and third legs being adjacent opposite edges of said article and said second leg being substantially equidistant from said first and third legs,
  b. a second conductor having fourth and fifth legs substantially parallel to said first axis, said fourth leg being substantially equidistant from said first and second legs and said fifth leg being substantially equidistant from said second and third legs.

* * * * *